US006779173B1

United States Patent
Yomiya et al.

(10) Patent No.: US 6,779,173 B1
(45) Date of Patent: Aug. 17, 2004

(54) CONTROL SYSTEM WITH AN EMBEDDED MICROCOMPUTER

(75) Inventors: Hisashi Yomiya, Tokyo (JP); Nobuyuki Yamauchi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/376,982

(22) Filed: Aug. 19, 1999

(30) Foreign Application Priority Data

Aug. 20, 1998 (JP) .......................................... P10-234445

(51) Int. Cl.[7] ................................................. G06F 9/44
(52) U.S. Cl. ........................ 717/121; 717/122; 717/170
(58) Field of Search ....................... 717/11, 1, 101–123, 717/168–170, 175; 711/1–2, 6, 100–102

(56) References Cited

U.S. PATENT DOCUMENTS 6,075,939 A * 6/2000 Bunnell et al. ................. 717/1

FOREIGN PATENT DOCUMENTS

| EP | 0901074 A2 | * 3/1999 | ............ G06F/9/46 |
|---|---|---|---|
| JP | 9-152969 | 6/1997 | |

OTHER PUBLICATIONS

IBM Technical Disclosure Bulletin, , "Real–Time Operating System for Digital Processors", vol. 36, No. 9A, pp. 71–74, Sep. 1993.*
IBM Technical Disclosure Bulletin, , "Signal Processor Operating System Task Schedule and Dispatch Operation", vol. 38, No. 10, pp. 529–536, Oct. 1995.*
Zuberi et al., "EMERALDS: A Microkernel for Embedded Real–Time Systems", IEEE, pp. 241–249, Jun. 1996.*

* cited by examiner

*Primary Examiner*—Tuan Dam
*Assistant Examiner*—Ted T. Vo
(74) *Attorney, Agent, or Firm*—Oblon, Spivak, McClelland, Maier & Neustadt, P.C.

(57) ABSTRACT

An improved control system with an embedded microcomputer is described which makes it possible to facilitate procedures for maintenance and modification of the specification and effectively use existing software resources by means of a configurable real-time OS. The real-time OS comprises an operation descriptor for storing control data for controlling the plurality of the tasks respectively, a kernel for controlling the operation of the control system with reference to the operation descriptor, and an interface provided for receiving data for modification of the control system and rewriting said operation descriptor in order to update said real-time OS.

18 Claims, 10 Drawing Sheets

(a), (b) SERIAL COMMUNICATION INTERFACE
(c), (d) ID RefTaskPriority (ID taskid):
   (void*) RefTaskCode (ID taskid):

(e), (f) void SetTaskPriority (ID taskid, PRI tskpri):
   void SetTaskStack (ID taskid, (void*) stackadr):

EVENT FLAGS

EVENTS 0 AND 2 TAKE PLACE

CONTROL SYSTEM WITH AN EMBEDDED MICROCOMPUTER

BACKGROUND OF THE INVENTION

1. Field of the Invention

The present invention is related to an improved control system with an embedded microcomputer for an electric appliance. In particular, the present invention is related to an improved control system with an embedded microcomputer which makes it possible to facilitate procedures for maintenance and modification of the specification.

2. Prior Art

In the recent years, the architecture of an control system with an embedded microcomputer becomes significantly sophisticated, and therefore the system is frequently controlled by a specific control program, which has been usually referred to as a real-time OS.

The maintenance of an electric appliance, such as a copying machine, is performed by rewriting data stored in the memory of the system in many cases. Particularly, the target board of the system is connected with a terminal for maintenance through a network in order to download updated data to a flush memory for finishing desired modification of the system. This procedure makes it possible to significantly reduce the maintenance cost as compared with replacement of the target board of the system.

On the other hand, the data items which can be rewritten are limited to the items which are referred to by application software. This is because the modification tends to be sophisticated if the modification is exerted upon the operation of the system. Particularly, in the case of the use of a real-time OS, the modification of the specification of the system is fettered by complexity in terms of those other than the interfaces with applications.

This places obstacles in the way of making effective use of available software resources. Particularly, as compared with a real-time OS, the complexities of application software have been increased so that the total reliability of the system is endangered by complicated application software, resulting in substantial difficulties for maintenance.

The following description of the prior art technique is made in the case that the modification is exerted upon the operation of the system. First, it is assumed that the modification can be conducted only with application programs. As one of the exemplary cases, it is desired to change the order of a plurality of the application program modules which are switchingly running in turn under the control by the real-time OS. It is impossible to accomplish the desired modification by rewriting the data referred to by the application software because the order of the application program modules is defined within the real-time OS. Usually, the order of the application program modules is determined by the real-time OS in accordance with the property assigned to each of the application program modules. The property is stored in a control table of the real-time OS together with other control data so that, in this case, it is difficult to accomplish the desired modification by modifying the application program. In this case, the configuration information of the real-time OS is modified followed by re-building the system again.

Next, it is assumed that the modification can not be accomplished by the original specification of the real-time OS. For example, the modification of synchronization as provided by the real-time OS is one of such cases. Namely, as one of the exemplary cases, the modification is desired to synchronize a plurality of program modules for the system which has been designed to control the execution timing of a single program module.

There are generally two solutions for this case. One solution is to modify the behavior of the application program. Namely, the effective synchronization is established for a plurality of the modules by combining the execution timing of the respective program module. However, while this is effective in the case of a small scale application program, it becomes difficult to identify locations of the application program to be synchronized in the case of a large scale application program.

Another solution is to modify the real-time OS itself. In this case, it is required to re-build the entirety of the real-time OS so that the influence may possibly affect the operation of the system. Accordingly, it becomes difficult to maintain the reliability of the operation of the entire system. Anyway, the modification has to be conducted by an expert of the real-time OS and therefore this solution is not effective in practice.

Finally, it is assumed that a new additional function is needed for the application software. In this case, a new process which does not have existed before must be introduced so that it can not be realized by modifying existing data. The modification of this kind is provided as a version-up service rather than simple maintenance. Namely, the new process is introduced to the application software followed by re-building the system. In the actual case, the version-up service is conducted by replacing the target board with a new target board in which the new system is installed. The replacement of the hardware requires a number of steps incurring much labor cost in addition to the hardware cost.

On the other hand, the operational environments of the control system with an embedded microcomputers are connected to networks in many cases. It is therefore expected to accomplish version-up of the system by transferring a new module for implementing additional functions.

As detailedly explained in the above, a number of steps is required, if the modification can not be accomplished simply by changing data as stored, incurring much labor cost. Furthermore, to many software engineers, the maintenance process sometimes becomes knotty and troublesome.

Accordingly, in the case of the prior art, there are following shortcomings.

1) When the specification of the system is modified by changing the property of the application software, the target program has to be modified followed by re-building the system. This results in the increase in the maintenance cost while the maintenance service is conducted by replacing the target board with a new target board in which the new system (ROM) is installed, rather than by simply transferring a new module through a network.

2) When the desired modification is not supported by the current specification of the control system with an embedded microcomputer, the control program itself has to be modified. This means that the modification has to be conducted by an expert of the real-time OS resulting in complexity of the maintenance service, so that it is difficult to simplify the maintenance procedure. Also, this places obstacles in the way of making effective use of available software resources because availability of existing software is limited by the current specification of the control system with an embedded microcomputer.

3) In the case that a new function is added to the system, a new module for implementing the new function has to be inserted to the application program, followed by re-building the system, so that it is difficult to simplify the maintenance procedure.

SUMMARY OF THE INVENTION

The present invention has been made in order to solve the shortcomings as described above. It is an important object of the present invention to provide an improved control system with an embedded microcomputer which makes it possible to facilitate procedures for maintenance and modification of the specification and effectively use existing software resources.

In brief, the above and other objects and advantages of the present invention are provided by a new and improved control system with an embedded microcomputer for controlling an application program having a plurality of tasks under a real-time OS, said real-time OS comprising: an operation descriptor for storing control data for controlling the plurality of the tasks respectively; a kernel for controlling the operation of said control system as well as the plurality of the tasks with reference to the operation descriptor; and an interface provided for receiving data for modification of said control system and rewriting said operation descriptor in order to update said real-time OS.

Also, in accordance with a preferred embodiment of the present invention, said control data contains the priority levels given to the respective tasks.

Furthermore, in accordance with a preferred embodiment of the present invention, said operation descriptor stores a program module in addition to said control data.

Furthermore, in accordance with a preferred embodiment of the present invention, said program module is an additional function module.

Furthermore, in accordance with a preferred embodiment of the present invention, said kernel controls the operation of said control system and the plurality of the tasks with reference to said control data of said operation descriptor.

In accordance with another aspect of the present invention, a control system with an embedded microcomputer for controlling an application program under a real-time OS, said real-time OS comprising: a kernel for controlling the operation of said control system as well as the application program, wherein at least part of said kernel is configured to be replaced by a new module; an operation descriptor for storing the new module for said kernel; and an interface provided for receiving the new module for said kernel, saving the new module to said operation descriptor and transferring the new module for said kernel to said kernel in order to update said real-time OS.

Also, in accordance with a preferred embodiment of the present invention, said application program comprises a plurality of tasks controlled by the real-time OS.

Furthermore, in accordance with a preferred embodiment of the present invention, said operation descriptor stores a program module in addition to said control data.

Furthermore, in accordance with a preferred embodiment of the present invention, said program module is an additional function module.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF EMBODIMENTS

In the following explanation, a control system with an embedded microcomputer in accordance with several embodiments will be explained in details with reference to figures. The control program for a control system with an embedded microcomputer has been generally called as a real-time OS, which term is used also in the following description. One of the representative commercially available real-time OS is "I-TRON", which can be used in practice for designing the embodiments of the present invention as explained in the followings.

Figure 1:
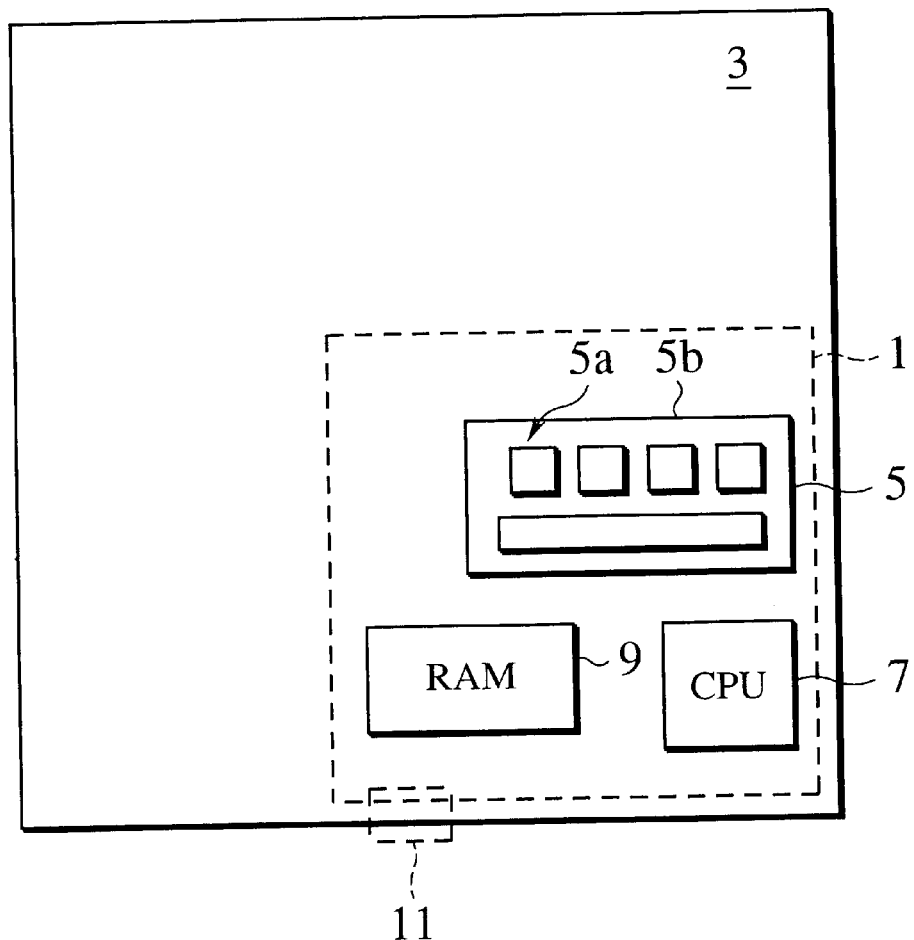
FIG. 1 is a schematic diagram showing a control system with an embedded microcomputer in accordance with an embodiment of the present invention.

FIG. 1 is a schematic diagram showing the control system with an embedded microcomputer in accordance with the embodiment of the present invention. In the figure, the control system 1 in accordance with the present invention is embedded in an electric appliance under the control, e.g., a copying machine, an industrial robot, a washing machine, an electronic jar and so forth and composed of a non-volatile memory 5 such as a flush memory, a processor 7, a RAM 9, a data input/output device 11.

The flush memory 5 includes a real-time OS, code modules and other data of an application program. The contents as stored in the flush memory 5 are transferred to the RAM 9 for executing the application program by the processor 7.

Figure 2:
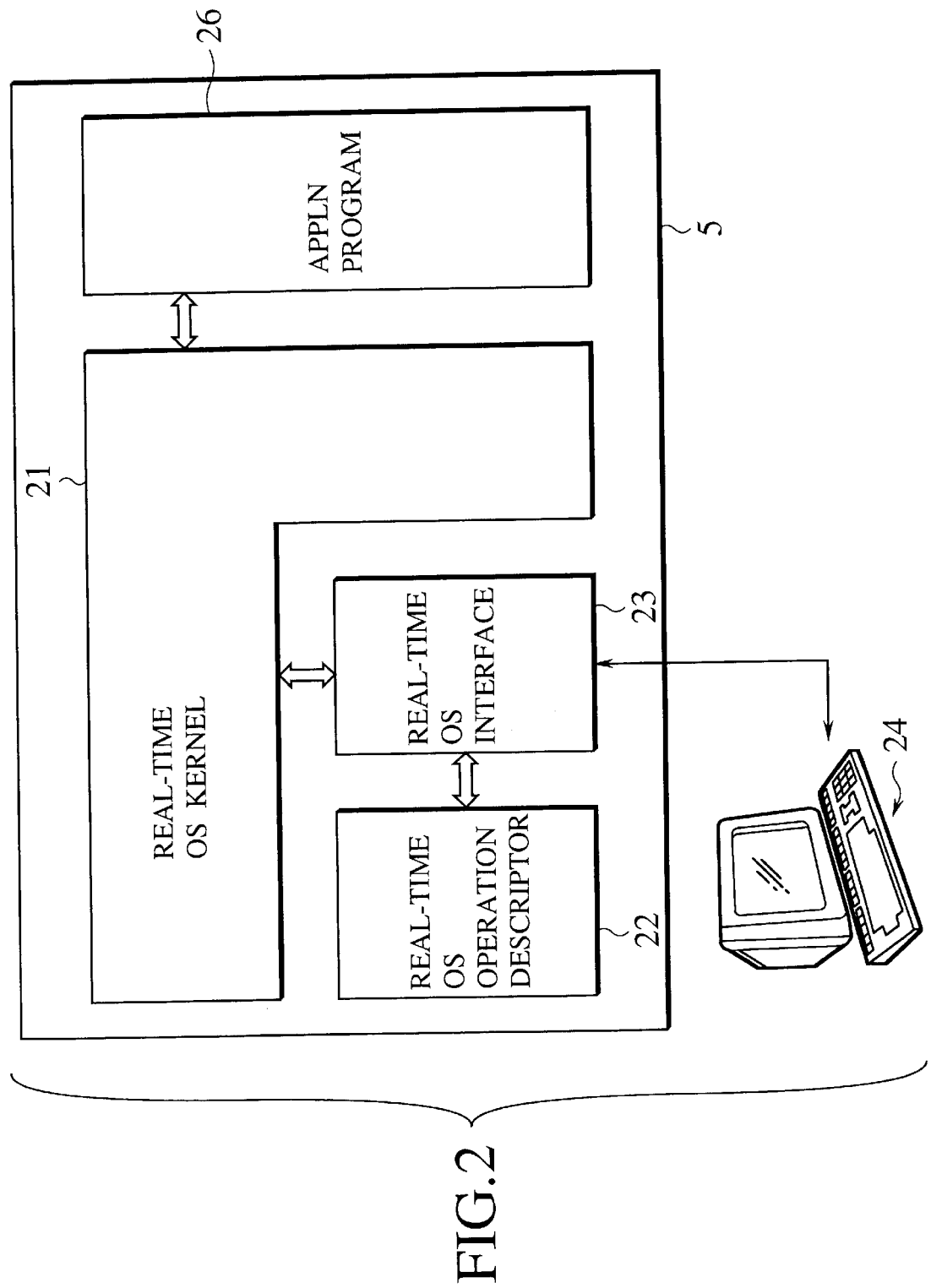
FIG. 2 is a schematic diagram showing the structure of the control system with an embedded microcomputer in accordance with the embodiment of the present invention.

The real-time OS has functions of establishing synchronization, providing exclusive control, scheduling tasks, providing a timer service, and other system services for an application program comprising modules which generate a plurality of tasks. FIG. 2 is a schematic diagram showing the structure of the control system with an embedded microcomputer in accordance with an embodiment of the present invention.

Figure 3:
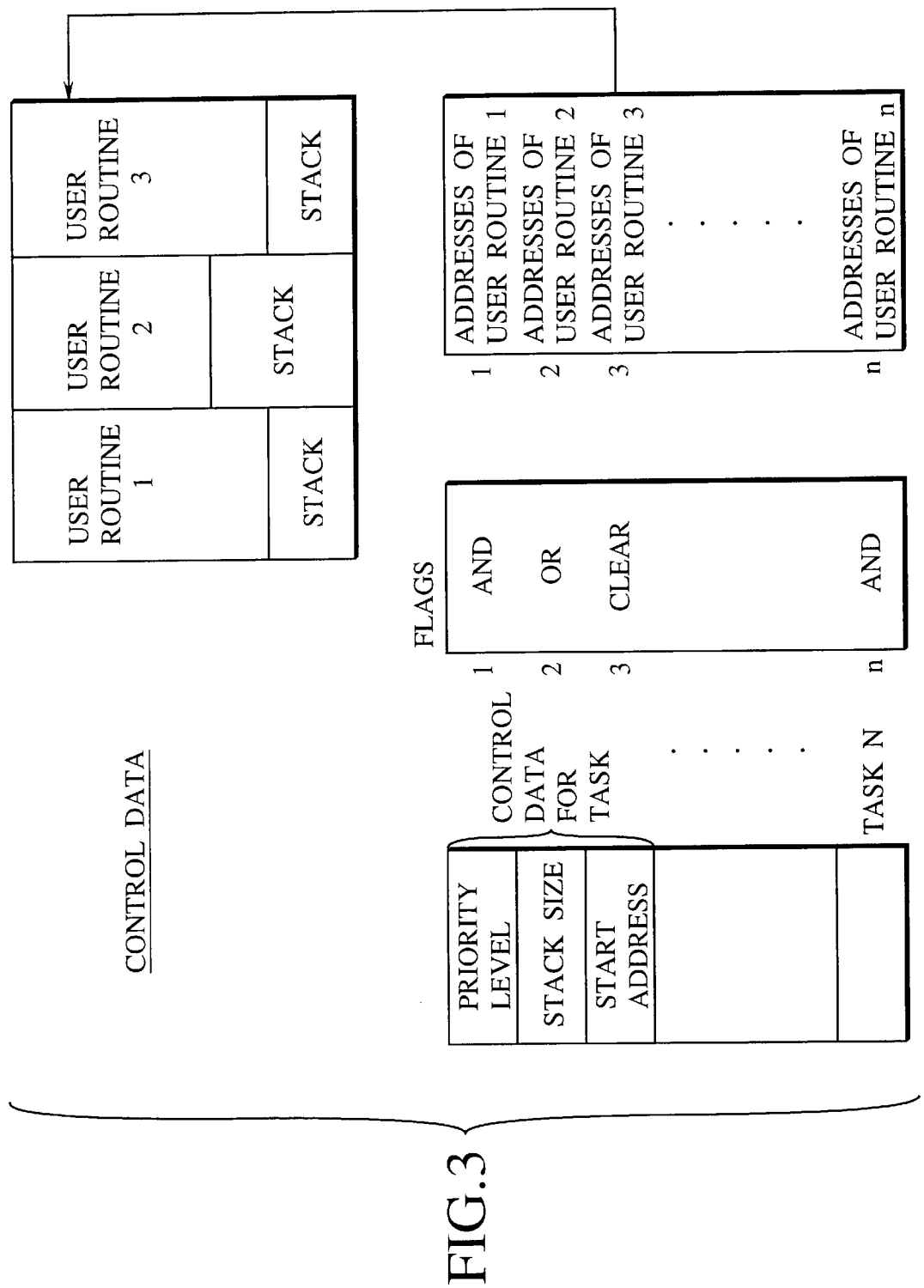
FIG. 3 is a schematic diagram showing an example of the data contained in the operation descriptor of the control system with an embedded microcomputer in accordance with the embodiment of the present invention.

In this case, the codes and data as loaded onto the RAM 9 include a kernel 21, an operation descriptor 22 and an interface 23. The application program 26 is coded by a user and run by communicating with the kernel. The operation descriptor 22 contains information indicative of the operation of the application program and information indicative of the behavior of the real-time OS. FIG. 3 is a schematic diagram showing an example of the data contained in the operation descriptor 22. Namely, there are provided the information of the priority level, the stack size and the start address given to each tasks. Also, a number of flags and addresses of user routines are written in the operation descriptor 22. The information as contained in the operation descriptor 22 can be accessed and modified through the interface. Meanwhile, the kernel 21, the operation descriptor 22, the interface 23 and the application program 26 as described above are loaded onto the RAM 9 when the system is powered on. The kernel 21 is the main body of the real-time OS and serves to actually perform general processes and provide general system services. The operation descriptor 22 determines the actual behavior of the system, and can be accessed and modified through the interface in order to accommodate desired functions.

Figure 4:
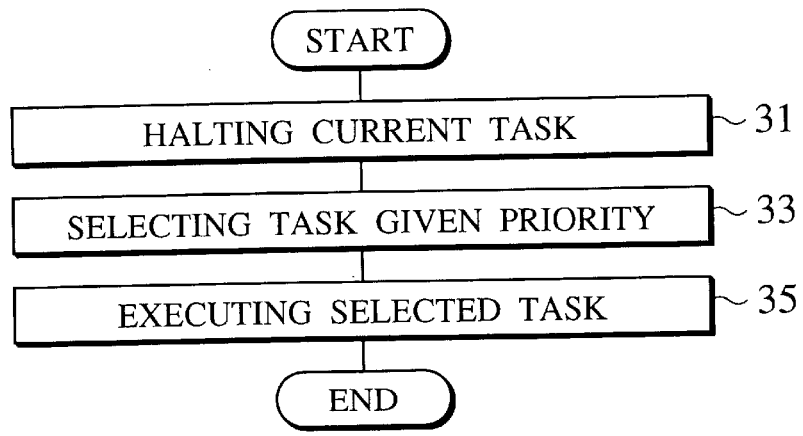
FIG. 4 is a flowchart showing the task switching operation of the control system with an embedded microcomputer in accordance with the embodiment of the present invention.

Generally speaking, a plurality of tasks can be running in turn under the control of the real-time OS. The order of the tasks is determined by the priority levels given to the respective tasks. Namely, control is given to a task having a higher priority level and then a task having a lower priority level. For example, when the task B having a higher priority level becomes ready to run during execution of the task A having a lower priority level, the current task is switched from the task A to the task B. FIG. 4 is a flowchart showing the task switching operation.

Namely, when a task having a higher priority level becomes ready to run during execution of a task having a lower priority level, the execution of the current task is halted in the step 31. In the step 33, the task having the highest priority is selected. In the step 35, the task as selected is allowed to run.

Accordingly, if the priority levels 1, 2 and 3 (a smaller number indicates a higher priority level) are given to the task A, the task B and the task C, the order of the tasks are always the task A, the task B and the task C. Usually, in order to modify the order of the tasks, the application program has to be rewritten, followed by re-building the system. Because of this, the modification of the system incurs much cost.

Figure 5:
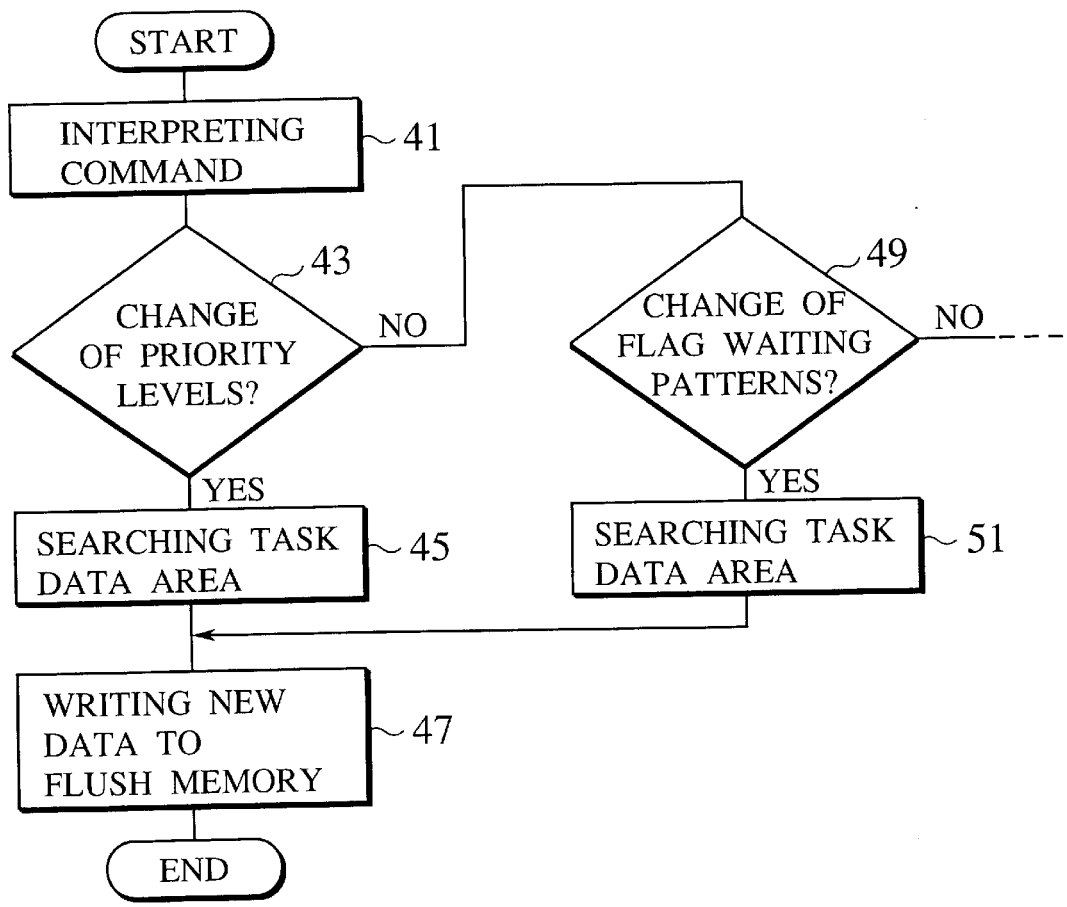
FIG. 5 is a flowchart showing the steps of the modification of the operation descriptor of the control system with an embedded microcomputer in accordance with the embodiment of the present invention.

In the case of the present invention, the data as used by the real-time OS such as the priority levels given to the respective tasks as described above is stored in the operation descriptor 2 in order to make it easy to modify the system configuration after having been placed in actual use. The operation descriptor 22 can be designed independent from the actual environment since the dependency upon the actual environment as associated with data access is absorbed by the interface. Namely, the behavior of the system can be modified without modifying the format of the operation descriptor 22 even in different environments. FIG. 5 is a flowchart showing the steps of the modification of the operation descriptor 22.

Namely, in the step 41, the command as input from the terminal for maintenance is interpreted. In the step 43, it is judged whether or not the modification is the change of the priority levels given to the respective tasks. If the modification is the change of the priority levels, the data area containing the priority flags is searched in the step 45, followed by writing the modification into the flush memory in the step 47.

If the modification is not the change of the priority levels, it is judged whether or not the modification is the change of the flag waiting pattern in the step 49. If the modification is the change of the flag waiting pattern, the data area containing the flag waiting pattern is searched in the step step 51, followed by writing the modification into the flush memory in the step 47. If the modification is not the change of the flag waiting pattern in the step 49, it is judged whether or not the modification is another change if necessary.

Figure 6:
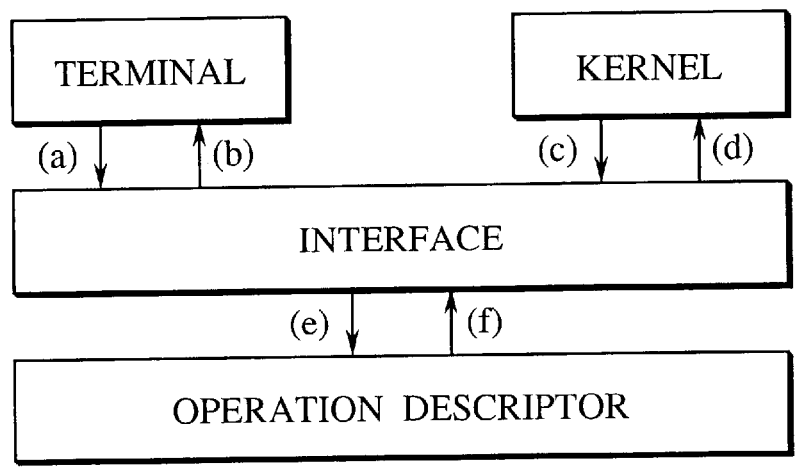
FIG. 6 is a schematic diagram showing exemplary operation of inputting/outputting data through the interface of the control system with an embedded microcomputer in accordance with the embodiment of the present invention.

The kernel 21 controls the operation of the system by exchanging input/output data with the interface 23 with reference to the contents of the operation descriptor 22, which can be customized by users. FIG. 6 is a schematic diagram showing exemplary operation of inputting/outputting data through the interface. Accordingly, the kernel 21 and the operation descriptor 22 are implemented in accordance with the interface specification as illustrated in FIG. 6.

The operation of the present invention will be explained in details with a copying machine as one example. First, it is assumed that the system accommodating only one type of sheet is modified in order to accommodate a plurality of types of sheets. Furthermore, it becomes necessary for the modification to modify the order of steps in order that the step of checking the type of sheet is conducted in advance of the step of forwarding a sheet while the step of checking the type of sheet has been conducted after the step of forwarding a sheet. Particularly, the order of the task for forwarding a sheet and the task for checking the type of sheet is reversed during running the software.

Figure 7:
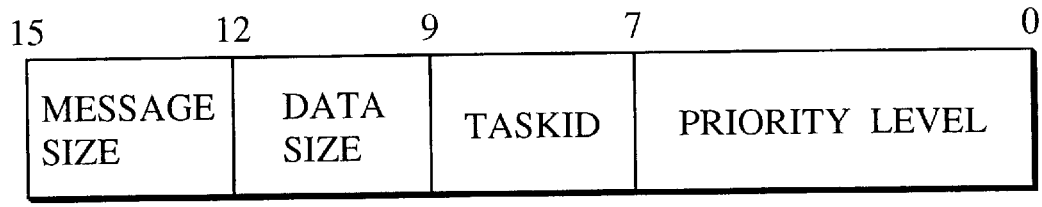
FIG. 7 is a schematic diagram showing an example of the data format for communication through RS232C of the control system with an embedded microcomputer in accordance with the embodiment of the present invention.

In order that accomplish the modification, a user stores into the terminal for maintenance 24 new data including the priority level given to the step of checking the type of sheet, followed by transferring the modification data to the interface by serial communication with the target board in the system. FIG. 7 is a schematic diagram showing an example of the data format for communication through RS232C.

Namely, as illustrated in FIG. 7, the data comprises 8 bits indicative of the priority level given to the task, 2 bits indicative of the ID of the task, 3 bits indicative of the data size, 3 bits indicative of the message size, arranged from the LSB in this order.

The type of data as received from the terminal for maintenance is examined, followed by forwarding the data to the operation descriptor 22 in the form of a predetermined input/output format. In this case, the information of the priority levels given to the respective tasks is stored in the location as part of control data in which attributes and properties of the system are stored.

The kernel 21 initiates the arrangement of the respective tasks by the priority levels given to the respective tasks as obtained from the operation descriptor when the system is initiated. In this case, the priority information is obtained through the interface 23. The step of checking the type of sheet is then conducted in advance of the step of forwarding a sheet after the modification.

Figure 8:
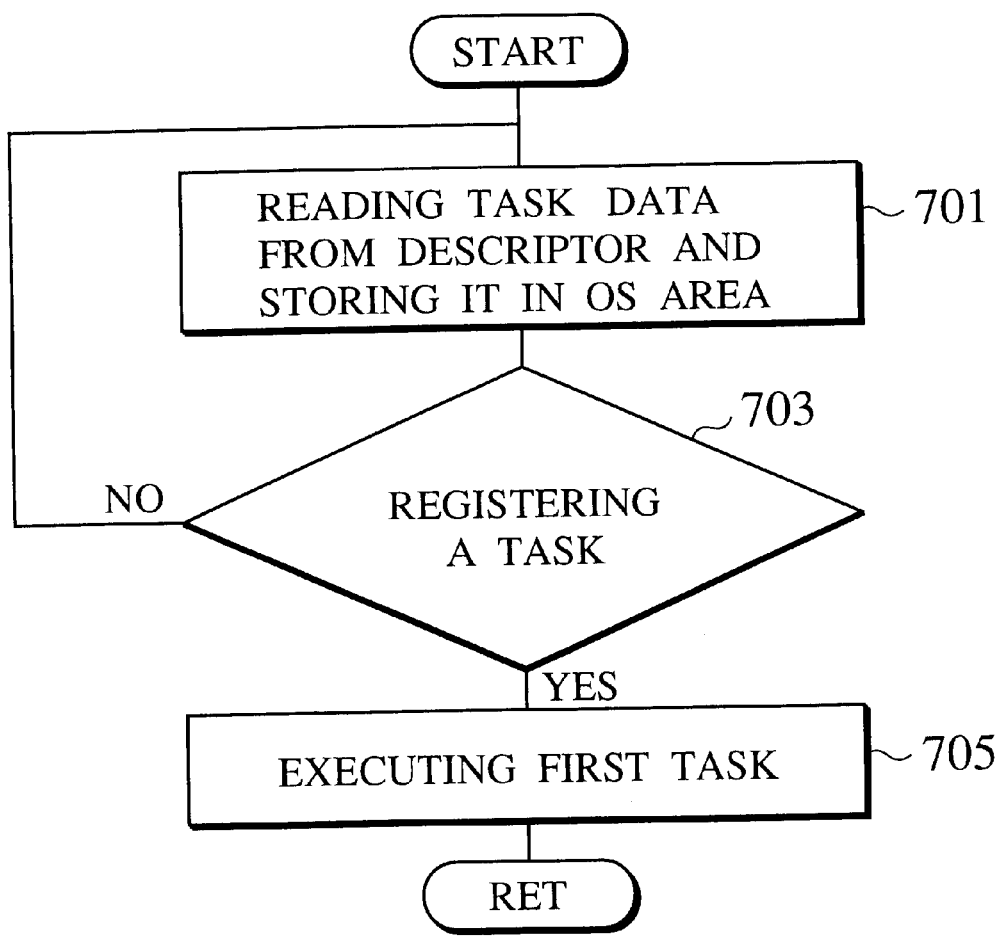
FIG. 8 is a flowchart showing the initialization process of the kernel of the control system with an embedded microcomputer in accordance with the embodiment of the present invention.

FIG. 8 is a flowchart showing the initialization process of the kernel. In the step 701, the tast data is read out from the operation descriptor and stored in the control table of the real-time OS for controlling the plurality of tasks respectively. In the step 703, the contents of the task data is examined. If the task data is indicative of registration of a further task, a further item of the task data is read out from the operation descriptor and stored in the control table of the real-time OS as control data again in the step 701. If the task data is not indicative of registration of a further task, the initialization process is completed by transferring control to the task having the highest priority.

Figure 9:
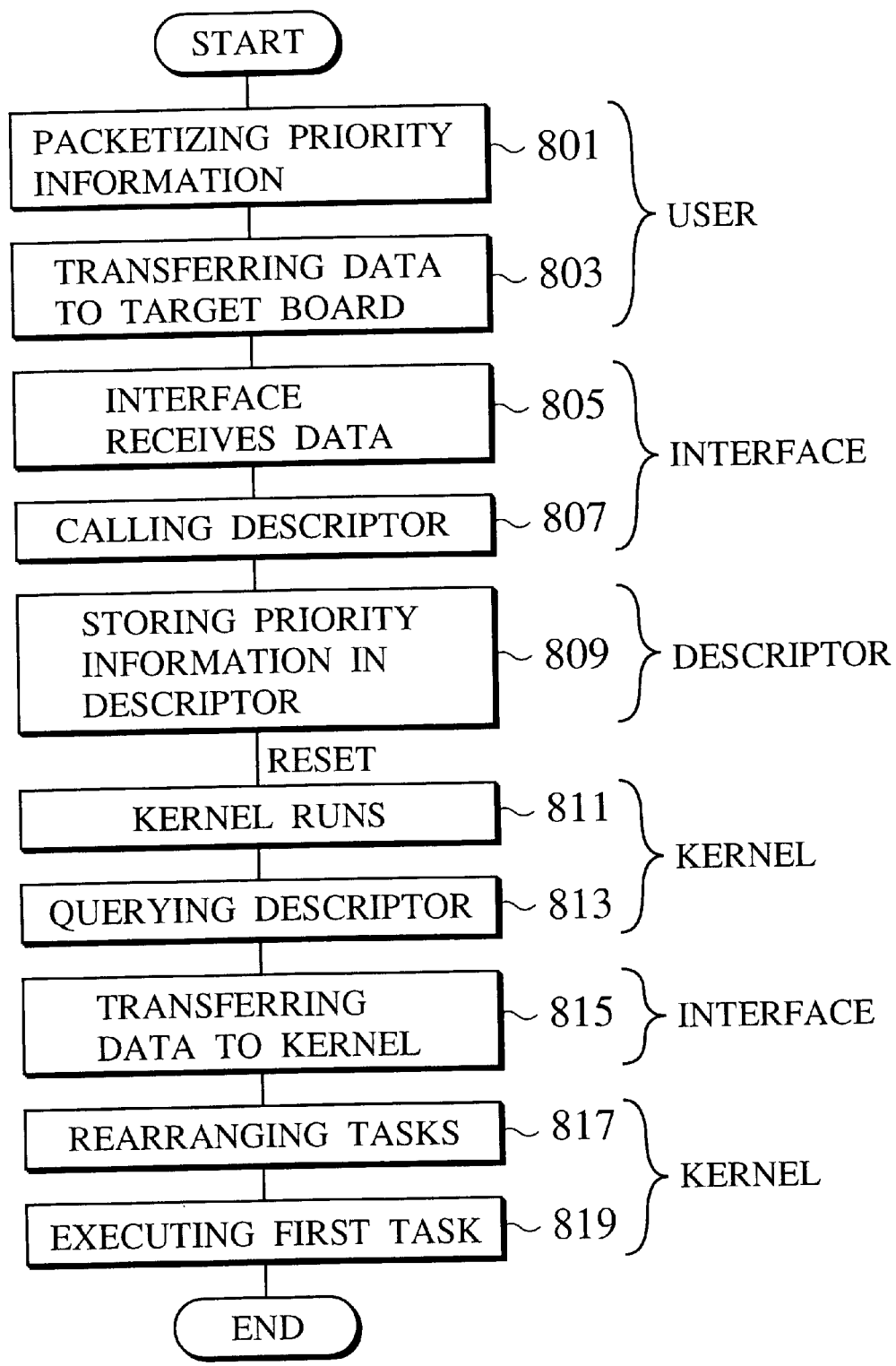
FIG. 9 is a flowchart showing the procedure of the modification of the priority levels of tasks which run in the control system with an embedded microcomputer in accordance with the embodiment of the present invention.

Namely, a user can conduct his purpose by the above procedure. FIG. 9 is a flowchart showing the procedure of the modification as described above.

First, in the step 801, one or more packet for communication is generated with one or more priority level in the step 801 and transferred to the target board in the step 803. The steps 801 and 803 are conducted by a user. The packet is received by the interface in the step 805. In the step 807, the operation descriptor is called by the interface in accordance with the predetermined format as described above. The steps 805 and 807 are conducted by the interface. In the step 809, the operation descriptor stores the information of the priority levels given to the respective tasks in response to the call by the interface. The kernel starts by the reset interrupt in the step 811. In the step 813, the kernel requests the priority information from the interface during the initialization process of the kernel as described above. In the step 815, the interface transfers the priority information to the kernel in response to the request. In the step 817, the respective tasks are arranged in the appropriate order by the real-time OS. In the step 819, the initialization process is completed by transferring control to the task having the highest priority.

Next, a second embodiment of the present invention will be explained with respect to figures. In this embodiment, the advantages of the present invention are described in the case that the modification of the kernel 21 is required.

Figure 10:
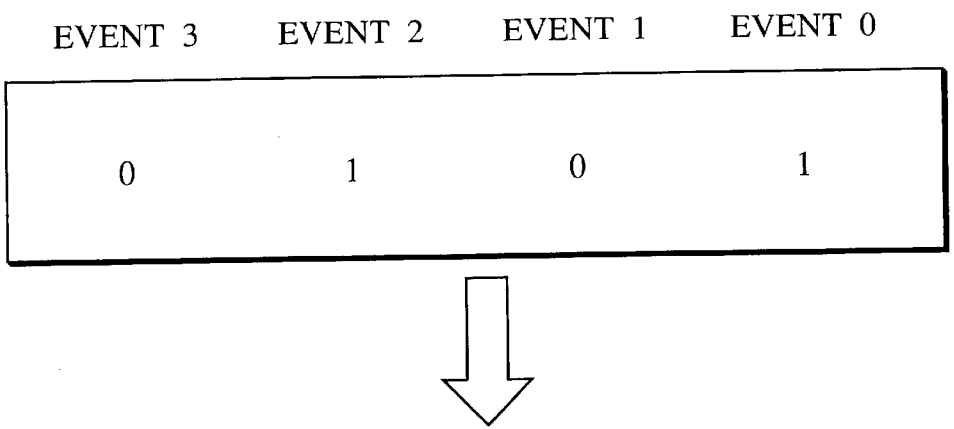
FIG. 10 is a schematic diagram showing an example of event flags of the control system with an embedded microcomputer in accordance with the embodiment of the present invention.

Usually, one or more event flag is provided in the kernel of a real-time OS for the purpose of establishing the synchronization of a plurality of events. One of the event flags corresponds to one bit of a memory location as illustrated in FIG. 10, which is a schematic diagram showing an example of event flags 0 to 3 among which the events 0 and 2 take place. The specification of the event flags is dependent upon the actual one of real-time OSes. For example, the number of the event flags is different among real-time OSes.

The modification of a software associated with the modification of the specification of the application is conducted by the use of an existing software component in many cases. However, the normal operation of the system is no longer guaranteed if the modification is related to the peculiar items or values of the specification of the real-time OS, such as the number of the event flags. Accordingly, when the modification is required beyond the specification of the real-time OS, the application software is modified in order that an equivalent process to that as desired can be realized, followed by re-building the system.

In the case of the present invention, part of the real-time OS is replaced in order to provide a desired function which is required by the application program. In the followings, an example will be explained in the case that an external facsimile machine is connected to a copying machine which has been running alone.

After power on, the copying machine checks the hardware and, if no problem, becomes ready for operation. The initialization process of the copying machine alone with no facsimile machine as connected is started after confirming the event flag indicating that the hardware of the copying machine is ready. In this case, only one event flag, i.e., only one bit is necessary for synchronization. In the actual case, there are available many real-time OSes which provide only a single event flag and also many application softwares developed for the real-time OSes of this kind.

In this example, synchronization is established also for the facsimile machine so that substantial modification of the application software is inevitable if only the event flag of 1 bit is utilized. It is assumed that a software which has been commercially available or developed anew for controlling the facsimile machine is to be installed in the copying machine. This software is assumed to raise one event flag (one bit) in the memory space of the copying machine. The event flag as raised is used to determine if the facsimile machine becomes ready to operation. In such a case, it is natural, reasonable and easy to modify the event flag function of the kernel in order to handle a plurality of event flags.

Figure 11:
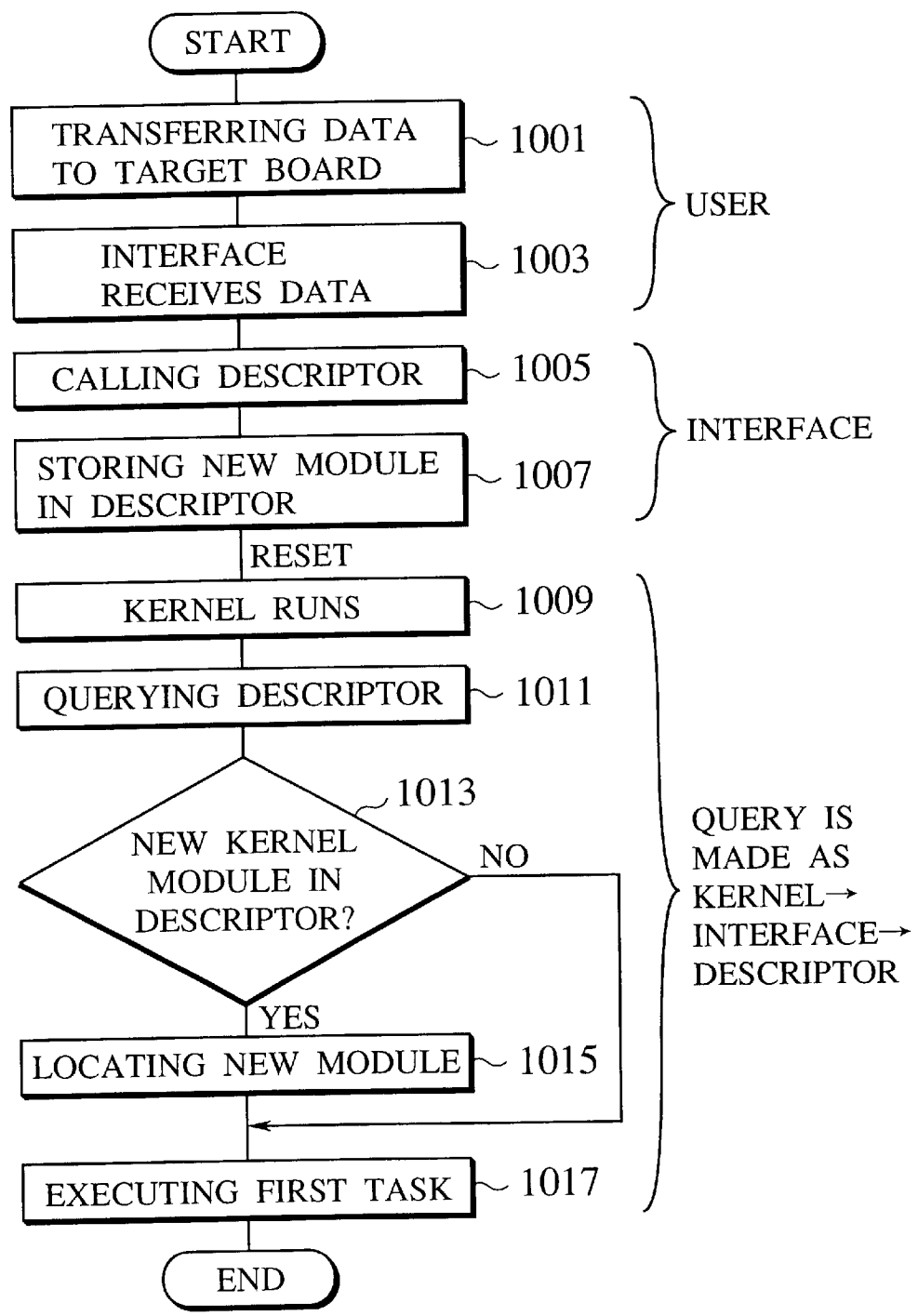
FIG. 11 is a flowchart showing the procedure of the modification of the functions of the kernel of the control system with an embedded microcomputer in accordance with the embodiment of the present invention.
Figure 12:
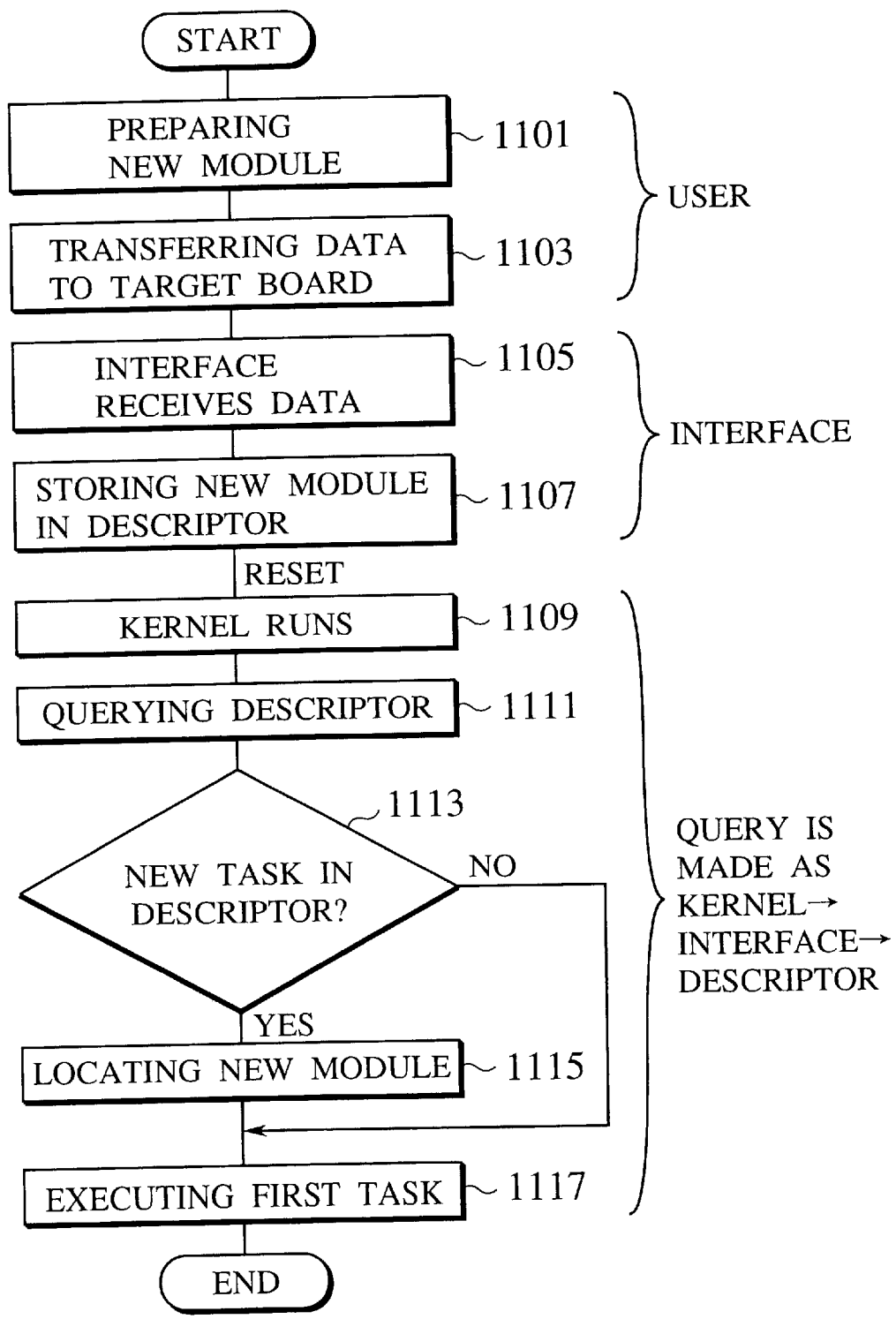
FIG. 12 is a flowchart showing the procedure of the introduction of a new function to the control system with an embedded microcomputer in accordance with the embodiment of the present invention.

In the case of the present invention, a new module which is installable in the kernel 21 and capable of handling a plurality of event flags is transferred to the operation descriptor from the terminal for maintenance 24 through the interface 23. The kernel 21 detects the module by querying the interface 23, receives and locates the new module in a proper place of the memory space of the kernel. The new module capable of handling a plurality of event flags is then functioning as part of the kernel 21 so that the modification of the system behavior is accomplished without modification of the application program. FIG. 11 is a flowchart showing the procedure of the modification of the functions of the kernel as described above.

First, in the step 1001, the new kernel module is transferred to the target board. The step 1001 is conducted by a user. In the step 1003, the interface receives the new kernel module. In the step 1005, the operation descriptor is called by the interface in accordance with a predetermined means as described above. In the step 1007, the operation descriptor additionally stores the new module therein in response to the call by the interface. The steps 1005 and 1007 are conducted by the interface. The kernel starts by the reset interrupt in the step 1009. In the step 1011, it is judged whether or not the new kernel module has been stored in the operation descriptor during the initialization process of the kernel. If there is a new kernel module in the operation descriptor in the step 1013, the new kernel module is located in a proper place of the memory space of the kernel to replace the previous module. In the step 1019, the initialization process is completed by transferring control to the task having the highest priority.

Next, a third embodiment of the present invention will be explained with respect to figures. In this case, an additional function is introduced into the system. The process of this embodiment of the present invention is similar as the embodiments described above.

For example, when an additional function such as the facsimile transmission is introduced to a copying machine, there are introduced to the copying machine new error phenomena such as transmission disability and so on, so that it becomes necessary to install new tasks for handling the new errors. In this case, new modules of the new tasks for handling the new errors are transferred to the interface 3 of the target board from the terminal for maintenance 24 by serial communication, during maintenance. The new tasks for handling the new errors as received from the terminal for maintenance 24 are stored in the operation descriptor 2 through the interface 3. The kernel 21 queries the operation descriptor and rearranges all the tasks together with the new tasks in proper places of the memory space of the kernel.

By this configuration, even if an additional function is added to the system, the modification of the system behavior is accomplished without modification of the application program. FIG. 11 is a flowchart showing the procedure of the introduction of a new function to the system.

First, in the step 1101, the new module is transferred to the target board. In the step 1103, the interface receives data. The steps 1101 and 1103 are conducted by a user. In the step 1105, the operation descriptor is called by the interface. In the step 1107, the operation descriptor additionally stores the new module therein in response to the call by the interface. The steps 1105 and 1007 are conducted by the interface. The kernel starts by the reset interrupt in the step 1009. In the step 1111, it is judged whether or not the new module of the additional task has been stored in the operation descriptor during the initialization process of the kernel. If there is a new module in the operation descriptor in the step 1013, the new module is located in a proper place of the memory space. In the step 1117, the initialization process is completed by transferring control to the task having the highest priority.

As detailedly explained in the above, in accordance with the present invention, the modification of the system behavior is accomplished without modification of the application program. It is therefore possible to make effective use of existing software resources, resulting in improvement of the productivity and the maintenance effectiveness.

As explained above, in accordance with the present invention, the following advantages are expected.

1) When the specification of the system is modified by changing the property of the application software, the modification of the system behavior is accomplished without modification of the application program, while in accordance with the prior art technique the target program has to be modified followed by re-building the system. This results in the significant decrease in the maintenance cost since the maintenance service is conducted by simply transferring a new module through a network without need for replacement of the target board with a new target board in which the new system (ROM) is installed.

2) When the desired modification is not supported by the current specification of the control system with an embedded microcomputer, it is possible to update the functional module in question of the real-time OS by replacement while in accordance with the prior art technique the entirety of the control program (the real-time OS) itself has to be modified, followed by re-building the system. This means that the modification can be conducted by a usual engineer rather than an expert of the real-time OS resulting in simplification of the maintenance service, so that it is possible to decrease the maintenance cost. Also, this removes obstacles in the way of making effective use of available software resources due to limited availability of existing softwares by the current specification of the control system with an embedded microcomputer.

3) In the case that a new function is added to the system, it is possible to introduce the new function without need for re-building the system, while in accordance with the prior art technique a new module for implementing the new function has to be inserted to the application program, followed by re-building the system. This also results in the significant decrease in the maintenance cost since the maintenance service is conducted by simply transferring a new module through a network without need for replacement of the target board with a new target board in which the new system (ROM) is installed.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A control system with an embedded microcomputer configured to control an application program having a plurality of tasks under a real-time OS, said real-time OS comprising:

an operation descriptor configured to store control data that controls the plurality of the tasks respectively;

a kernel configured to control operation of said control system as well as the plurality of the tasks with reference to the operation descriptor; and an interface configured to receive data for modification of said control system and to rewrite said operation descriptor in real time in order to update said real-time OS without rebuilding said real-time OS, wherein the operation descriptor is configured to receive, through said interface, a new module installable in said kernel and configured to handle a plurality of event flags, and said kernel is configured to detect the new module by querying said interface, and to receive and locate the new module in a memory of said kernel so that the new module, which is configured to handle the plurality of event flags, is then a functioning part of said kernel.

2. The control system with an embedded microcomputer as claimed in claim 1, wherein said control data contains priority levels given to the plurality of the tasks, respectively.

3. The control system with an embedded microcomputer as claimed in claim 1, wherein said operation descriptor stores a program module in addition to said control data.

4. The control system with an embedded microcomputer as claimed in claim 3, wherein said program module is an additional function module.

5. The control system with an embedded microcomputer as claimed in claim 1, wherein said kernel controls operation of said control system and the plurality of the tasks with reference to said control data of said operation descriptor.

6. A control system with an embedded microcomputer configured to control an application program under a real-time OS, said real-time OS comprising:

a kernel configured to control operation of said control system and the application program, wherein at least part of said kernel is configured to be replaced by a new module;

an operation descriptor configured to store the new module for said kernel; and an interface configured to receive the new module for said kernel, to save the new module to said operation descriptor, and to transfer the new module for said kernel to said kernel in real-time in order to update said real-time OS without rebuilding said real-time OS, wherein the operation descriptor is configured to receive, through said interface, a new module installable in said kernel and configured to handle a plurality of event flags, and said kernel is configured to detect the new module by querying said interface, and to receive and locate the new module in a memory of said kernel so that the new module, which is configured to handle the plurality of event flags, is then a functioning part of said kernel.

7. The control system with an embedded microcomputer as claimed in claim 6, wherein said application program comprises a plurality of tasks controlled by the real-time OS.

8. The control system with an embedded microcomputer as claimed in claim 6, wherein said operation descriptor stores a program module in addition to said control data.

9. The control system with an embedded microcomputer as claimed in claim 8, wherein said program module is an additional function module.

10. A control system with an embedded microcomputer for controlling an application program having a plurality of tasks under a real-time OS, said real-time OS comprising:

means for storing control data that controls the plurality of the tasks, respectively;

means for controlling operation of said control system and the plurality of the tasks with reference to the means for storing; and means for receiving data for modification of said control system and for rewriting said means for storing in real-time in order to update said real-time OS without rebuilding said real-time OS, wherein the means for storing receives, through said means for receiving, a new module installable in said means for controlling and configured to handle a plurality of event flags, and said means for controlling detects the new module by querying said means for receiving, and receives and locates the new module in a memory of said means for controlling so that the new module, which is configured to handle the plurality of event flags, is then a functioning part of said means for controlling.

11. The control system with an embedded microcomputer as claimed in claim 10, wherein said control data contains priority levels given to the plurality of tasks, respectively.

12. The control system with an embedded microcomputer as claimed in claim 10, wherein said means for storing stores a program module in addition to said control data.

13. The control system with an embedded microcomputer as claimed in claim 12, wherein said program module is an additional function module.

14. The control system with an embedded microcomputer as claimed in claim 10, wherein said means for controlling controls operation of said control system and the plurality of the tasks with reference to said control data of said means for storing.

15. A control system with an embedded microcomputer for controlling an application program under a real-time OS, said real-time OS comprising:

means for controlling operation of said control system and the application program, wherein at least part of said means for controlling is configured to be replaced by a new module;

means for storing said new module for said means for controlling; and means for receiving said new module for said means for controlling, for saving said new module to said means for storing, and for transferring said new module for said means for controlling to said means for controlling in real-time in order to update said real-time OS without rebuilding said real-time OS, wherein the means for storing receives, through said means for receiving, a new module installable in said means for controlling and configured to handle a plurality of event flags, and said means for controlling is configured to detect the new module by querying said means for receiving, and receives and locates the new module in a memory of said means for controlling so that the new module, which is configured to handle the plurality of event flags, is then a functioning part of said means for controlling.

16. The control system with an embedded microcomputer as claimed in claim 15, wherein said application program comprises a plurality of tasks controlled by the real-time OS.

17. The control system with an embedded microcomputer as claimed in claim 15, wherein said means for storing stores a program module in addition to said control data.

18. The control system with an embedded microcomputer as claimed in claim 17, wherein said program module is an additional function module.

* * * * *